(12) United States Patent
Song et al.

(10) Patent No.: US 12,212,848 B2
(45) Date of Patent: Jan. 28, 2025

(54) CAMERA MOVEMENT CONTROL METHOD AND DEVICE

(71) Applicant: SAMSUNG ELECTRONICS CO., LTD., Suwon-si (KR)

(72) Inventors: Wonseok Song, Suwon-si (KR); Junghwan Jo, Suwon-si (KR); Jiyoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 17/866,253

(22) Filed: Jul. 15, 2022

(65) Prior Publication Data
US 2022/0360714 A1 Nov. 10, 2022

Related U.S. Application Data

(63) Continuation of application No. PCT/KR2021/000463, filed on Jan. 13, 2021.

(30) Foreign Application Priority Data

Jan. 16, 2020 (KR) .......................... 10-2020-0006219

(51) Int. Cl.
H04N 23/68 (2023.01)
H04N 23/63 (2023.01)
(Continued)

(52) U.S. Cl.
CPC ......... H04N 23/687 (2023.01); H04N 23/632 (2023.01); H04N 23/6811 (2023.01);
(Continued)

(58) Field of Classification Search
CPC ........... H04N 5/23296; H04N 5/23258; H04N 5/23287; H04N 5/145; H04N 23/695;
(Continued)

(56) References Cited

U.S. PATENT DOCUMENTS 9,319,588 B2 4/2016 Shibata
2007/0058966 A1 3/2007 Irinouchi et al.
(Continued)

FOREIGN PATENT DOCUMENTS

JP 2007-81767 3/2007
JP 2016-90973 5/2016
(Continued)

OTHER PUBLICATIONS

Office Action dated Oct. 2, 2024 in Korean Patent Application No. 10-2020-0006219 and English-language translation.

Primary Examiner — Xi Wang
(74) Attorney, Agent, or Firm — Nixon & Vanderhye, P.C.

(57) ABSTRACT

An example camera movement control method includes: activating, by an electronic device, a camera functionally connected to the electronic device; displaying, on the basis of the activation of the camera, an image of an object outside the electronic device on a display functionally connected to the electronic device; confirming the movement of the image of the object; and correcting the image by means of an image stabilizer functionally connected to the electronic device on the basis of the movement. The correcting of the image can include: calculating an image correction angle with respect to the movement; and controlling the image stabilizer based on the image correction angle.

15 Claims, 17 Drawing Sheets

(51) Int. Cl.
*H04N 23/69* (2023.01)
*H04N 23/695* (2023.01)

(52) U.S. Cl.
CPC ......... *H04N 23/6812* (2023.01); *H04N 23/69* (2023.01); *H04N 23/695* (2023.01)

(58) Field of Classification Search
CPC .. H04N 23/6811; H04N 23/69; H04N 23/687; G03B 13/36; G06T 7/20; H04M 1/00
USPC .................................. 348/208.5, 455, 556.1
See application file for complete search history.

(56) References Cited

U.S. PATENT DOCUMENTS

| | | | | |
|---|---|---|---|---|
| 2009/0109321 | A1* | 4/2009 | Takeuchi ............... | G03B 13/36 348/345 |
| 2011/0105181 | A1* | 5/2011 | McLeod ............ | H04N 23/6811 348/208.5 |
| 2016/0134814 | A1 | 5/2016 | Yoneyama | |
| 2016/0212349 | A1 | 7/2016 | Imada | |
| 2017/0134649 | A1 | 5/2017 | Wakamatsu | |
| 2017/0163899 | A1* | 6/2017 | Irie ....................... | H04N 23/632 |
| 2017/0257574 | A1* | 9/2017 | Honjo .................. | H04N 23/687 |
| 2018/0176470 | A1 | 6/2018 | Kim et al. | |
| 2019/0045126 | A1 | 2/2019 | Takeuchi | |
| 2020/0124940 | A1* | 4/2020 | Shimada ................ | G03B 13/36 |
| 2020/0228692 | A1* | 7/2020 | Wakamatsu ....... | H04N 23/6812 |
| 2020/0404182 | A1 | 12/2020 | Song et al. | |

FOREIGN PATENT DOCUMENTS

| | | |
|---|---|---|
| JP | 2016-136242 | 7/2016 |
| JP | 2019-29962 | 1/2017 |
| JP | 2017-92592 | 5/2017 |
| KR | 10-2008-0091982 | 10/2008 |
| KR | 10-2010-0042917 | 4/2010 |
| KR | 10-2018-0070264 | 6/2018 |
| KR | 10-2019-0088644 | 7/2019 |

\* cited by examiner

CAMERA MOVEMENT CONTROL METHOD AND DEVICE

CROSS-REFERENCE TO RELATED APPLICATIONS

This application is a continuation of International Application No. PCT/KR2021/000463 designating the United States, filed on Jan. 13, 2021, in the Korean Intellectual Property Receiving Office and claiming priority to Korean Patent Application No. 10-2020-006219, filed on Jan. 16, 2020, in the Korean Intellectual Property Office, the disclosures of each of which are incorporated by reference herein in their entireties.

BACKGROUND

Technical Field

Various embodiments of the disclosure relate to a method and a device for controlling camera movements in electronic equipment.

Description of Related Art

Various types of devices including a smartphone, a tablet PC, a portable multimedia player (PMP), a personal digital assistant (PDA), a laptop personal computer (PC), and a wearable device, such as a wrist watch and a head-mounted display (HMD), may include a camera, and capture an image using the camera.

When images are captured using a camera included in an electronic device, correction for shaking of an optical module and/or focus adjustment may be required to obtain clear images.

SUMMARY

The type of an optical image stabilizer (OIS) used in a general camera includes a camera tilting scheme and a lens shift scheme.

In the lens shift scheme, shaking of an optical module is corrected through linear movement on a plane parallel to a focal plane of an image sensor.

In the camera tilting scheme, a camera lens and an image sensor are moved together to match an optical axis with a virtual axis connecting an object to the center of a camera module.

Even in a case of an electronic device including a camera using an optical image stabilizer, when a moving object is subjected to capturing, and/or when an image is captured using the camera being moved, image distortion may occur.

Through a method for controlling movements of a camera including an optical image stabilizer and an electronic device including a camera according to various embodiments of the disclosure, image shaking may be corrected by tracking movements of the camera and an object. Furthermore, various embodiments may provide, for example, a method and an electronic device for correcting movements of a camera in electronic equipment.

A method for controlling movement of a camera in an electronic device according to various embodiments of the disclosure may include: activating a camera functionally connected to the electronic device; based on the activation of the camera, displaying an image of an object located outside the electronic device on a display functionally connected to the electronic device; identifying a movement of the image of the object; and based on the movement, correcting the image using an image stabilizer functionally connected to the electronic device, wherein the correcting of the image includes: calculating an image correction angle for the movement; and based on the image correction angle, controlling the image stabilizer.

An electronic device according to various embodiments of the disclosure may include: a camera; a display; a memory; a sensor module; and a processor functionally connected to the camera, the display, the memory, and the sensor module, wherein the processor is configured to activate the camera, based on the activation of the camera, display an image of an object located outside the electronic device on the display, identify a movement of the image of the object, and based on the movement, perform correcting of the image using an image stabilizer functionally connected to the electronic device, and wherein the correcting of the image includes calculating an image correction angle for the movement, and based on the image correction angle, controlling the image stabilizer.

In a non-transitory computer-readable storage medium including instructions stored to execute a camera movement control operation when executed by a processor according to various embodiments of the disclosure, the instructions may include instructions for: activating a camera functionally connected to the processor; based on the activation of the camera, displaying an image of an object located outside an electronic device on a display functionally connected to the processor; identifying a movement of the image of the object; and based on the movement, correcting the image using an image stabilizer functionally connected to the camera, and wherein the correcting of the image may include: calculating an image correction angle for the movement; and based on the image correction angle, controlling the image stabilizer.

By a method for controlling movements of a camera and an electronic device including a camera according to various embodiments of the disclosure, movements of an object and/or a camera may be tracked and an optical image stabilizer may be controlled, thereby improving the effect of shaking correction.

By a method for controlling movements of a camera and an electronic device including a camera according to various embodiments of the disclosure, movements of an object and/or a camera may be tracked to estimate a correction range in which image shaking is possible, thereby improving a user experience regarding a timepoint of capturing an image of an object.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
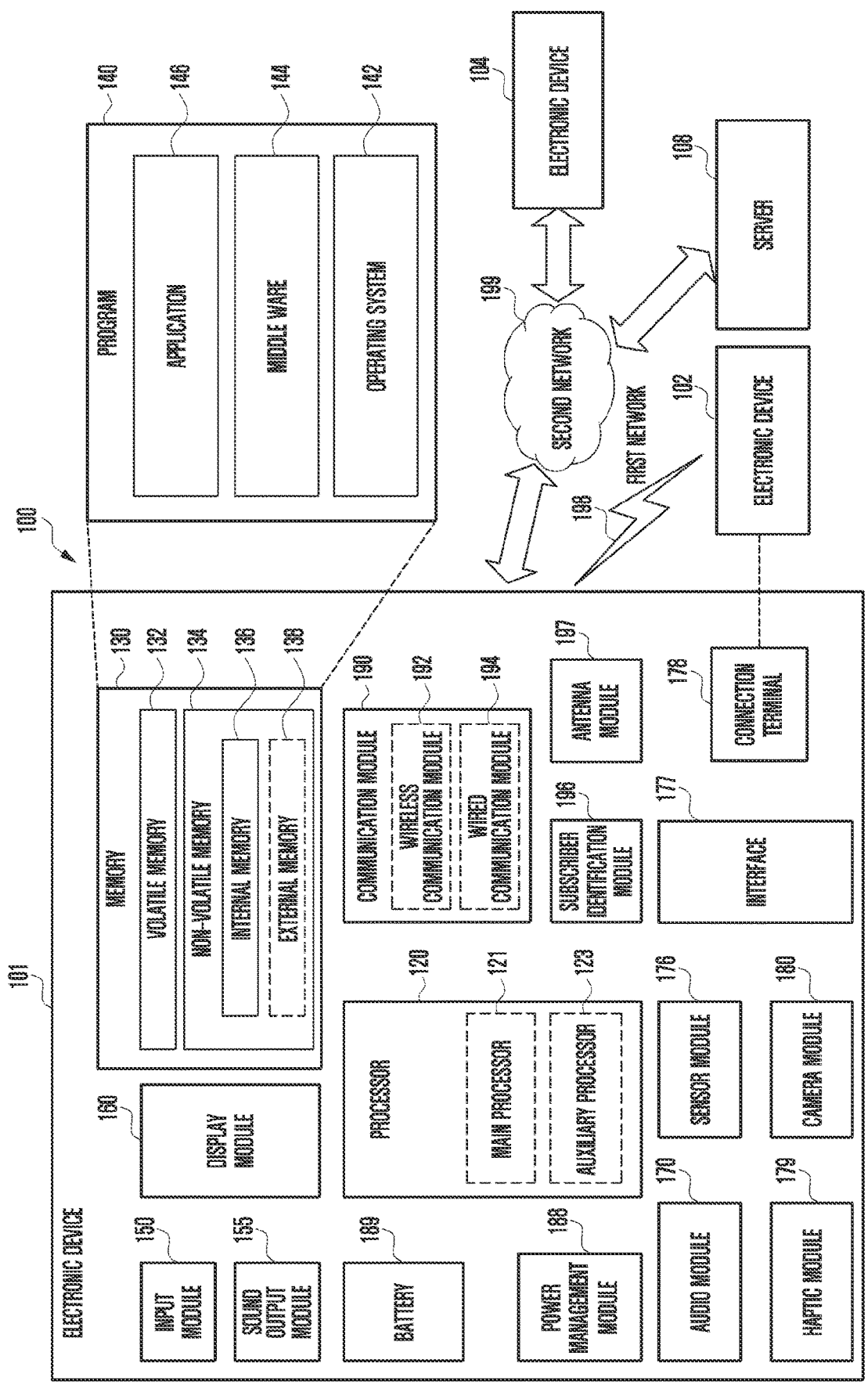
FIG. 1 is a block diagram of an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
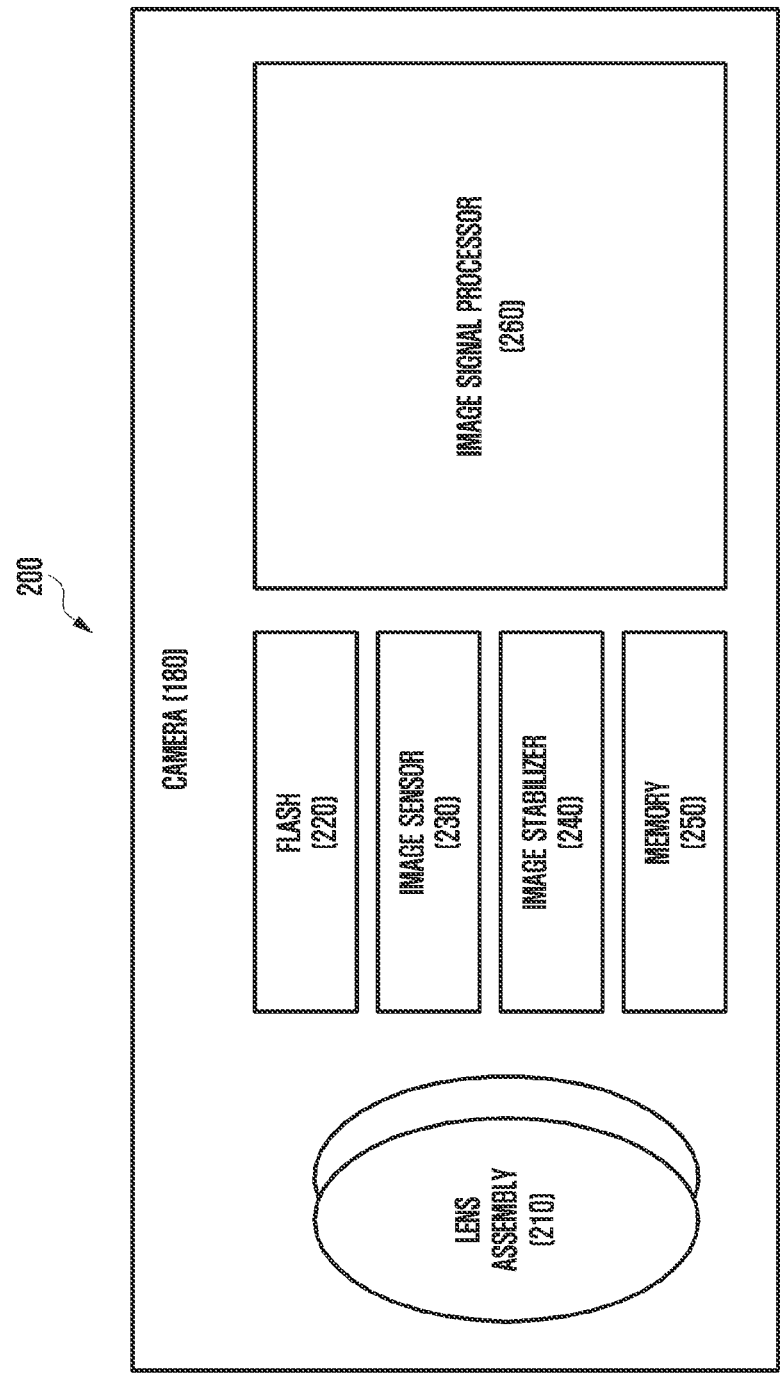
FIG. 2 is a block diagram illustrating an example of a camera according to various embodiments.

FIG. 2 is a block diagram 200 illustrating an example of a camera 180 according to various embodiments. Referring to FIG. 2, the camera 180 may include a lens assembly 210, a flash 220, an image sensor 230, an image stabilizer 240, a memory 250 (e.g., buffer memory), or an image signal processor 260. The lens assembly 210 may, for example, collect light radiated from an object to be captured. The lens assembly 210 may include one or more lenses. According to an embodiment, the camera 180 may include multiple lens assemblies 210. In this case, the camera 180 may configure, for example, a dual camera, a 360-degree camera, and/or a spherical camera. Some of the multiple lens assemblies 210 may have the same or similar lens attributes (e.g., angle of view, focal length, auto focusing, f number, or optical zoom), or at least one lens assembly may have one or more lens attributes different from those of a different lens assembly. The lens assembly 210 may include, for example, a wide-angle lens or a telephoto lens.

The flash 220 may, for example, emit light used to strengthen light reflected or radiated from an object. According to an embodiment, the flash 220 may include one or more light-emitting diodes (e.g., red-green-blue (RGB) LED, white LED, infrared LED, or ultraviolet LED), or a xenon lamp. The image sensor 230 may, for example, convert, into an electrical signal, light radiated or reflected from an object and then transferred via the lens assembly 210, so as to obtain an image corresponding to the object. According to an embodiment, the image sensor 230 may include, for example, one image sensor selected from among image sensors having different attributes, such as a red-green-blue (RGB) sensor, a black and white (BW) sensor, an infrared (IR) sensor, or an ultraviolet (UV) sensor, multiple image sensors having the same attribute, or multiple image sensors having different attributes. Each image sensor included in the image sensor 230 may be implemented using, for example, a charged coupled device (CCD) sensor or a complementary metal oxide semiconductor (CMOS) sensor.

The image stabilizer 240 may, for example, move the image sensor 230 or at least one lens included in the lens assembly 210 in a particular direction, or control an operation property of the image sensor 230 (e.g., adjust a read-out timing) in response to a movement of the camera 180 or the electronic device 101 including same. Therefore, at least a part of a negative effect of the movement on a captured image is compensated. According to an embodiment, the image stabilizer 240 may detect a movement of the camera 180 or the electronic device 101 using a sensor module (e.g., the sensor module 176 in FIG. 1) (e.g., a gyro sensor or acceleration sensor) disposed inside or outside the camera 180.

The image sensor 230 and the image stabilizer 240 may, for example, be configured as one module. For example, the image sensor 230 and the image stabilizer 240 may be configured as one module so as to rapidly process an image obtained via the image sensor, and a time required on signal transmission between each module may be reduced.

The memory 250 may, for example, at least temporarily store at least a part of an image obtained via the image sensor 230, for the next image processing work. For example, when image acquisition is delayed due to a shutter or multiple images are obtained at a high speed, an obtained original image (e.g., Bayer-patterned image or high-resolution image) may be stored in the memory 250, and a copy image (e.g., low-resolution image) corresponding thereto may be previewed via the display device 160. Thereafter, when a designated condition is satisfied (e.g., a user input or a system command), at least a part of the original image stored in the memory 250 may, for example, be obtained and processed by the image signal processor 260. According to an embodiment, the memory 250 may be configured as at least a part of the memory 130 in FIG. 1, or as a separate memory operated independently thereof.

The image signal processor 260 may, for example, perform one or more image processings of an image obtained via the image sensor 230 or an image stored in the memory 250. The one or more image processings may include, for example, depth map generation, three-dimensional modeling, panorama generation, feature point extraction, image composition, or image compensation (e.g., noise reduction, resolution adjustment, brightness adjustment, blurring, sharpening, or softening). Additionally or alternatively, the image signal processor 260 may, for example, perform control (e.g., exposure time control or read-out timing control) for at least one (e.g., the image sensor 230) among elements included in the camera 180. An image processed by the image signal processor 260 may be stored in the memory 250 so as to be additionally processed, or may be provided to an external element (e.g., the memory 130, the display device 160, the electronic device 102, the electronic device 104, or the server 108) of the camera 180. According to an embodiment, the image signal processor 260 may be configured as at least a part of the processor 120 in FIG. 1, or as a separate processor operated independently of the processor 120 in FIG. 1. When the image signal processor 260 is configured as a processor separate from the processor 120 in FIG. 1, at least one image processed by the image signal processor 260 may or may not be additionally processed by the processor 120 in FIG. 1 and then be displayed via the display device 160.

According to an embodiment, the electronic device 101 may include multiple cameras 180 having different attributes or functions. For example, the multiple cameras 180 may include at least one of a wide-angle camera, a telephoto camera, or an IR camera (e.g., time-of-flight camera or structured light camera). Similarly, at least one of the multiple cameras 180 may be a front-facing camera, and at least another one may be a back-facing camera.

Figure 3:
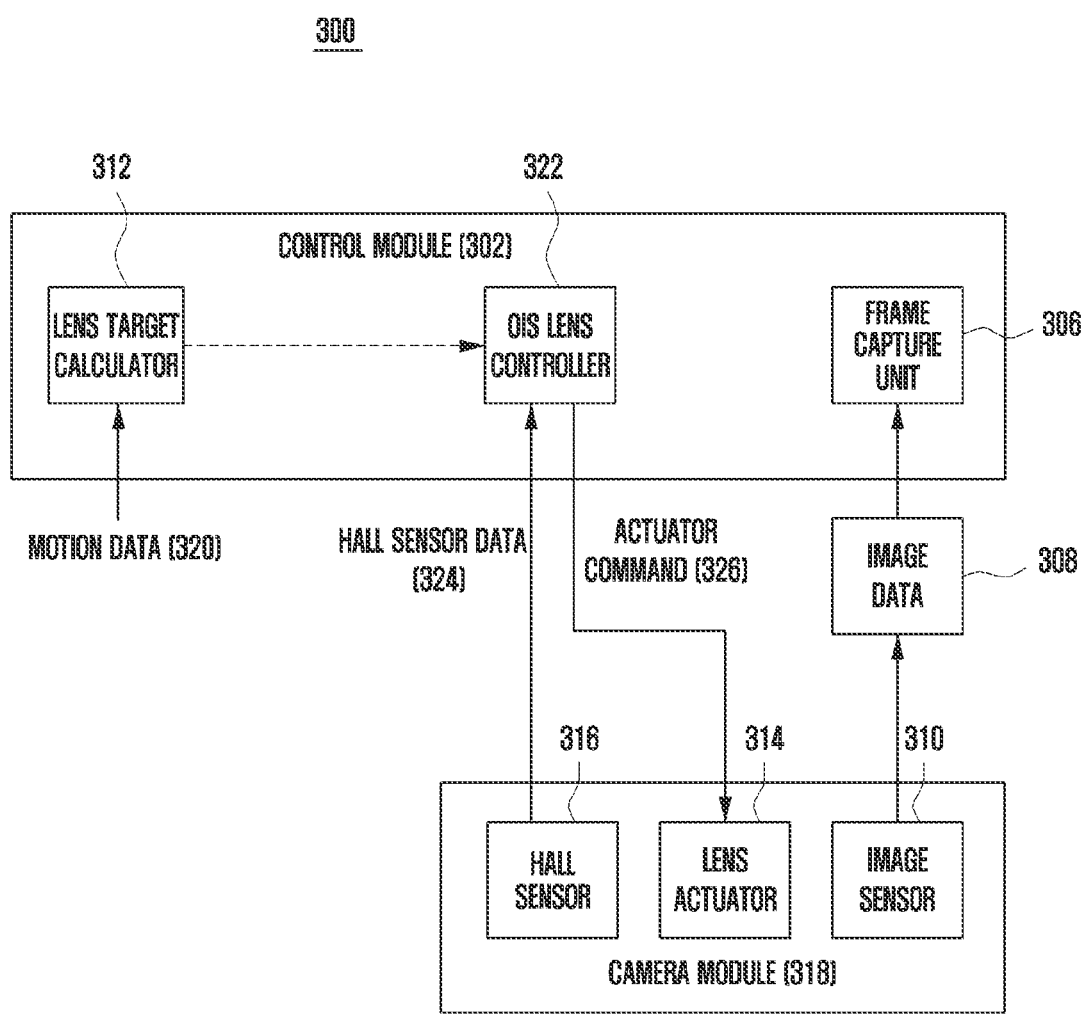
FIG. 3 is a diagram illustrating a correction system of an example camera having an optical image stabilizer according to various embodiments of the disclosure.

FIG. 3 is a diagram illustrating an example correction system 300 of the camera 180 having an optical image stabilizer according to various embodiments of the disclosure.

In various embodiments, the correction system 300 of the camera 180 may include a camera module 318 and/or a control module 302. The camera module 318 may be similar to or the same as the camera 180 in FIG. 1 and FIG. 2. The control module 302 may include a lens target calculator 312, an optical image stabilizer (OIS) lens controller 322, and/or a frame capture unit 306. The control module 302 may be similar to or the same as the processor 120 in FIG. 1 and/or the image signal processor 260 in FIG. 2.

In various embodiments, the camera module 318 may include a lens actuator 314, an image sensor 310, and a Hall sensor 316. The lens actuator 314 may be similar to or the same as, for example, the image stabilizer 240 in FIG. 2.

In various embodiments, the image sensor 310 may be similar to or the same as the image sensor 230 in FIG. 2.

In various embodiments, the correction system 300 of the camera 180 may receive motion data 320 from a sensor module (e.g., the sensor module 176 in FIG. 1). The control module 302 may, for example, receive the motion data 320 from the sensor module (e.g., the sensor module 176 in FIG. 1). The motion data 320 may, for example, include data related to a movement of the camera 180 and/or the electronic device 101.

In various embodiments, the image sensor 310 may generate and/or output image data 308 on an external object, and transmit the image data 308 to the frame capture unit 306 of the control module 302.

In various embodiments, the frame capture unit 306 may receive the image data 308 on an external object, which is generated and/or output from the image sensor 310.

In various embodiments, the lens target calculator 312 may compute (e.g., calculate) a starting position of a lens assembly (the lens assembly in FIG. 2) using the motion data 320. Moreover, the lens target calculator 312 may, for example, compute (e.g., calculate) a starting position of the lens actuator 314 (e.g., the lens stabilizer 240 in FIG. 2) using the motion data 320. An electronic device (e.g., the electronic device 101 in FIG. 1) may include, for example, information on a movement of the electronic device 101 and/or the camera 180 (e.g., the camera module 318) using the motion data 320.

In various embodiments, the motion data 320 may include information on an acceleration, a speed, a movement distance, a position, and/or a direction related to a movement of the electronic device 101, the information being obtained using the sensor module (e.g., the sensor module 176 in FIG. 1).

In various embodiments, the motion data 320 may include an acceleration, a speed, a movement distance, a position, and/or a direction related to a movement of a lens assembly (e.g., the lens assembly 210 in FIG. 2) and/or the lens actuator 314, which are detected using the sensor module (e.g., the sensor module 176 in FIG. 1).

In various embodiments, the lens assembly (e.g., the lens assembly 210 in FIG. 2) may include at least one lens which is subjected to movement and/or control by the OIS lens controller 322. The lens assembly (e.g., the lens assembly 210 in FIG. 2) may, for example, include at least one lens which is subjected to optical image stabilization (e.g., OIS) by the OIS lens controller 322.

The Hall sensor 316 may, for example, transmit Hall sensor data 324 to the OIS lens controller 322.

In various embodiments, the Hall sensor data 324 may include, for example, data on the position of the lens actuator 314 and/or data on the position of the lens assembly (e.g., the lens assembly 210 in FIG. 2).

In various embodiments, the OIS lens controller 322 may, for example, generate a command to control the lens actuator 314 and/or the lens assembly (e.g., the lens assembly 210 in FIG. 2), based on data on the position of the lens actuator 314 and/or data on the position of the lens assembly (e.g., the lens assembly 210 in FIG. 2).

In various embodiments, the camera module 318 may include at least one Hall sensor 316. At least one Hall sensor 316 may be, for example, coupled as a position sensor to the lens assembly (e.g., the lens assembly 210 in FIG. 2). In various embodiments, the Hall sensor 316 may detect the position of the lens assembly (e.g., the lens assembly 210 in FIG. 2). For example, the Hall sensor 316 may detect the position of the lens assembly (e.g., the lens assembly 210 in FIG. 2) which has been moved by a control of the OIS lens controller 322 for a position change. In addition, the Hall sensor 316 may, for example, detect the position of the lens actuator 314 which has been moved by a control of the OIS lens controller 322 for a position change.

In various embodiments, the Hall sensor 316 may transmit, to the OIS controller 322, the Hall sensor data 324 on the position of the lens assembly (e.g., the lens assembly 210 in FIG. 2). The Hall sensor 316 may, for example, transmit, to the OIS controller 322, the Hall sensor data 324 on the position of the lens actuator 314.

In various embodiments, the lens actuator 314 (e.g., the image stabilizer 240 in FIG. 2) may receive a drive and/or actuator command 326 from the OIS lens controller 322.

In various embodiments, the camera module 318 may include the lens assembly (e.g., the lens assembly 210 in FIG. 2) mechanically assembled above the image sensor 310 of the camera module 318.

In various embodiments, the OIS lens controller 322 may generate the drive and/or actuator command 326 to control the lens actuator 314, based on information on a starting position of the lens assembly (e.g., the lens assembly 210 in FIG. 2), received from the lens target calculator 312, and the Hall sensor data 324 (the position of the lens assembly (e.g., the lens assembly 210 in FIG. 2)) received from the Hall sensor 316.

In various embodiments, the OIS lens controller 322 may generate the drive and/or actuator command 326 to control the lens actuator 314, based on information on a starting position of the lens actuator 314, received from the lens target calculator 312, and the Hall sensor data 324 (the position of the lens actuator 314) received from the Hall sensor 316.

In various embodiments, the OIS lens controller 322 may transfer, to the lens actuator 314, the drive and/or actuator command 326 generated based on information on a starting position of a lens assembly (the lens assembly 210 in FIG. 2), received from the lens target calculator 312, and the Hall sensor data 324 (the position of the lens assembly (e.g., the lens assembly 210 in FIG. 2)) received from the Hall sensor 316.

In various embodiments, the lens actuator 314 mentioned in the description for FIG. 3 may be a camera tilting-type optical image stabilizer (tilting optical image stabilizer). The camera tilting-type optical image stabilizer employs a scheme of moving the lens assembly (e.g., the lens assembly 210 in FIG. 2) and the image sensor 310 so as to match an optical axis with a virtual axis connecting an object to the center of the camera module 318.

Figure 4:
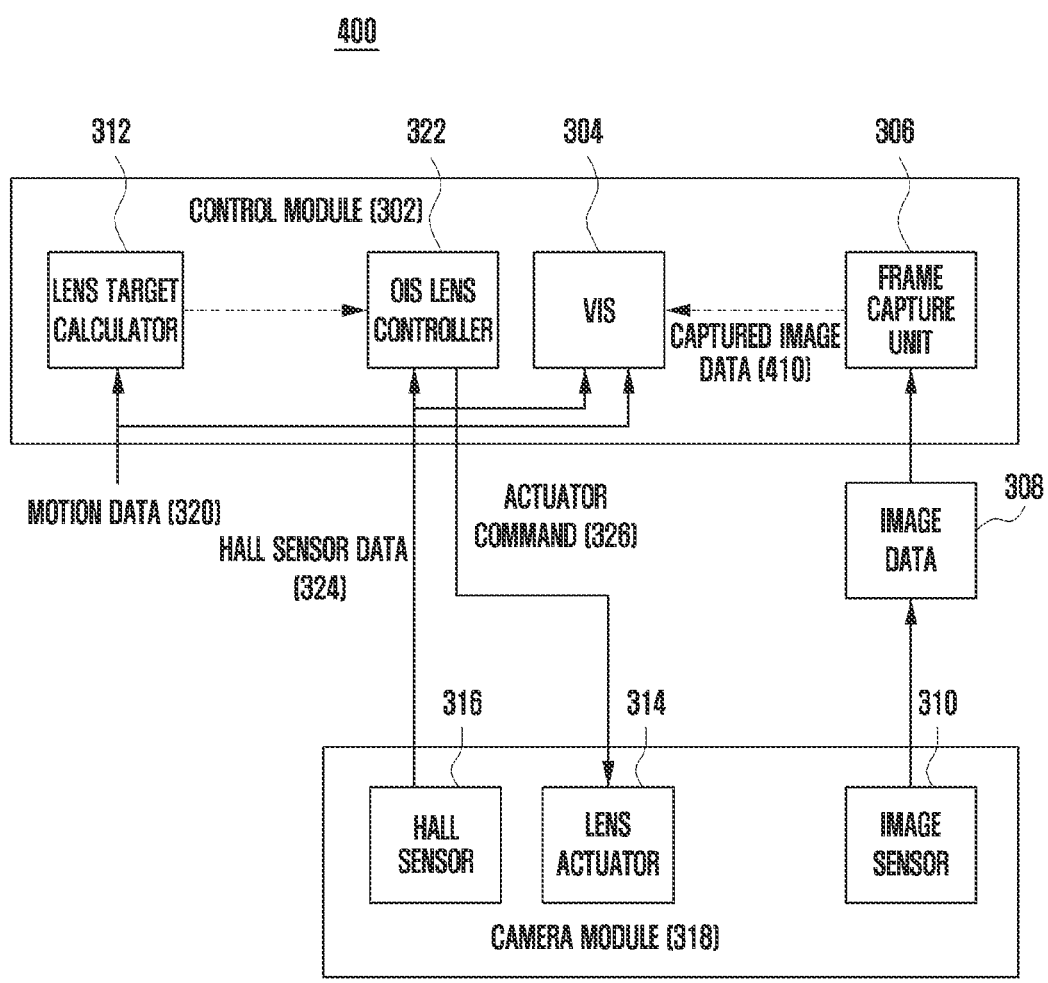
FIG. 4 is a diagram illustrating an example correction system of a camera having an optical image stabilizer according to various embodiments of the disclosure.

FIG. 4 is a diagram illustrating an example correction system 400 of the camera 180 having an optical image stabilizer according to various embodiments of the disclosure.

In various embodiments, the correction system 400 illustrated in FIG. 4 may further include a video image stabilizer 304 (hereinafter, VIS) in addition to the components of the correction system 300 illustrated in FIG. 3. For example, the VIS 304 may be included in the control module 302. At least one of elements of the correction system 400 according to an embodiment may be the same as or similar to at least one of elements of the correction system 300 in FIG. 3.

In various embodiments, the Hall sensor 316 may transmit the Hall sensor data 324 to the VIS 304. For example, the Hall sensor 316 may transmit, to the VIS 304, the Hall sensor data 324 on the position of a lens assembly (e.g., the lens assembly 210 in FIG. 2) and/or the Hall sensor data 324 on the position of the lens actuator 314.

In various embodiments, the VIS 304 may receive, from the Hall sensor 316, the Hall sensor data 324 on the position of the lens assembly (e.g., the lens assembly 210 in FIG. 2) and/or the lens actuator 314.

In various embodiments, the VIS 304 may receive the motion data 320 from a sensor module (e.g., the sensor module 176 in FIG. 1). For example, the VIS 304 may receive the motion data 320 from a gyro sensor or an acceleration sensor.

In various embodiments, the VIS 304 may receive captured image data 410 transferred from the frame capture unit 306. The frame capture unit 306 may, for example, generate captured image data using the image data 308 received from the image sensor 310.

In various embodiments, the frame capture unit 306 may transmit captured image data based on the image data 308 to the VIS 304.

In various embodiments, the VIS 304 may correct an image (e.g., video), based on the motion data 320, the Hall sensor data 324, and/or the captured image data 410. The VIS 304 may, for example, correct a video distortion (e.g., wobbling), based on the motion data 320, the Hall sensor data 324, and/or the captured image data 410. There is a small image distortion at the center part of an image, at which an optical axis linearly connecting the lens assembly (e.g., the lens assembly 210 in FIG. 2) with the image sensor 310, and a virtual axis linearly connecting an object with the lens assembly (e.g., the lens assembly 210 in FIG. 2) substantially match with each other. However, a distortion may occur at the peripheral part of an image, at which the optical axis and the virtual axis do not match with each other. Distortion may include, for example, crumpling of an image. Wobbling may include, for example, wrinkling of a peripheral part of an image.

In various embodiments, the lens actuator 314 mentioned in the description for FIG. 4 may be a shift-type optical image stabilizer (lens shift optical image stabilizer). This type of stabilizer corrects shaking by linearly moving the lens assembly (e.g., the lens assembly 210 in FIG. 2) on plane parallel to a focal plane of the image sensor 310.

Figure 5A:
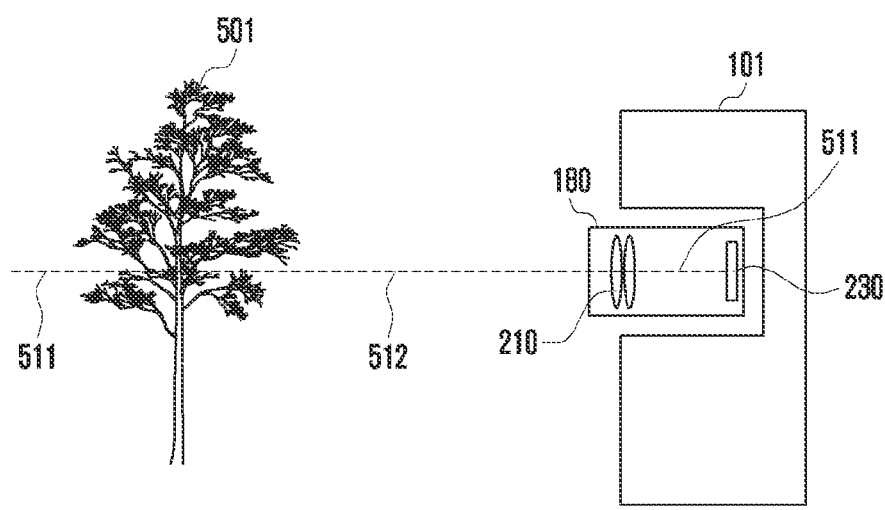
FIGS. 5A, 5B, and 5C are diagrams illustrating an example method for controlling movement of a camera according to various embodiments of the disclosure.
Figure 5B:
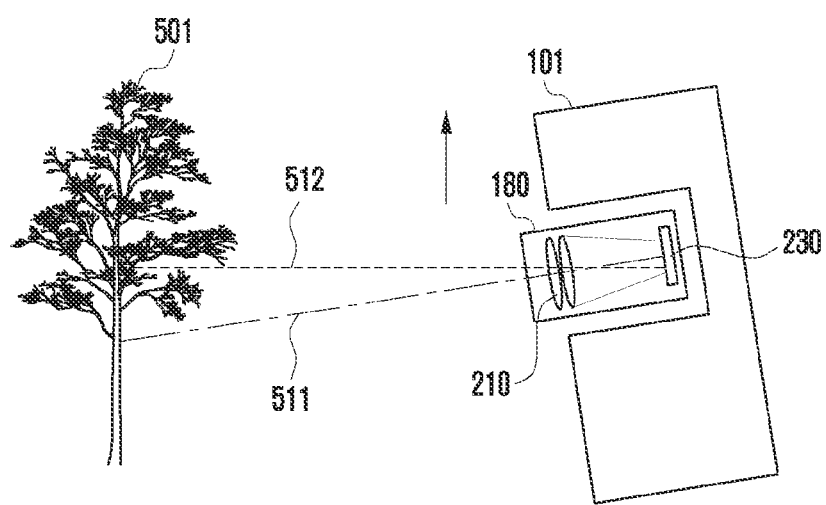
Figure 5C:
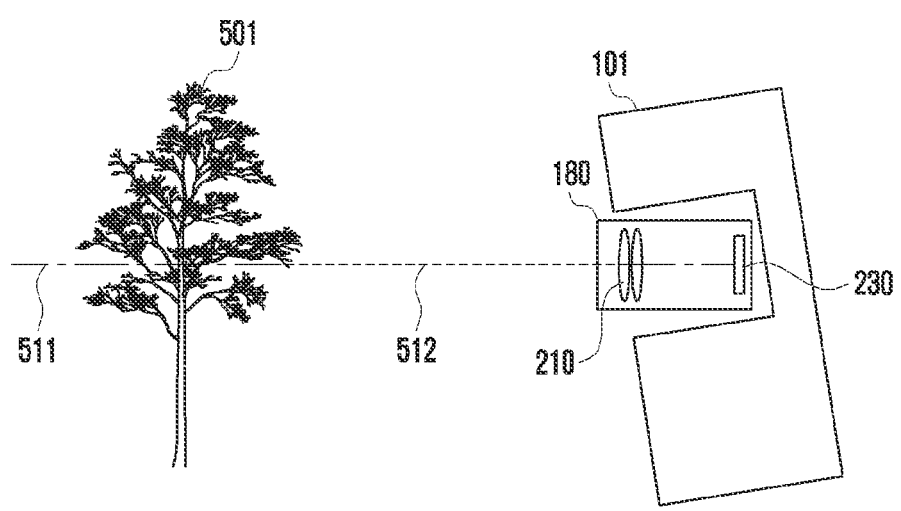

FIGS. 5A, 5B, and 5C are diagrams illustrating an example method for controlling movement of the camera 180 according to various embodiments of the disclosure.

FIG. 5A shows an operation related to image capturing using the camera 180 in a case in which there is no shaking of the electronic device 101.

According to various embodiments, the electronic device 101 may include the camera 180, the lens assembly 210, and/or the image sensor 230. The electronic device 101 may capture an image of an object 501 using the camera 180. For example, when there is no shaking of the electronic device 101 while an image of the object 501 is captured, a shaking-less image may be captured on the image sensor 230 of the camera 180. For example, a virtual axis 512 connecting the object 501 with the center of the camera module 501 and an optical axis 511 of the lens assembly 210 may match with each other, or be similar to each other. In addition, the optical axis 511 of the lens assembly 210 may be perpendicular to the image sensor 230.

In FIG. 5B, under a control of a processor (e.g., the image signal processor 260, the control module 302, and/or the processor 120), shaking of the electronic device 101 may be detected. When shaking of the electronic device 101 is detected, an optical axis 511 linearly connecting the lens assembly (e.g., the lens assembly 210 in FIG. 2) with the image sensor 310, and a virtual axis 512 linearly connecting the object 501 with the lens assembly (e.g., the lens assembly 210 in FIG. 2) may not match with each other.

In FIG. 5C, according to various embodiments, the electronic device 101 may control the camera 180 such that the virtual axis 512 and the optical axis 511 match with each other. For example, under a control of a processor (e.g., the image signal processor 260, the control module 302, and/or the processor 120), the electronic device 101 may control the camera 180 to move so that the virtual axis 512 connecting the object 501 with the center of the camera 180 and the optical axis 511 of the lens assembly 210 match with each other, or are similar to each other. For example, when the optical axis 511 of the lens assembly 210 is inclined according to shaking of the electronic device 101, the electronic device 101 may control the lens actuator 314 (e.g., the image stabilizer 240 in FIG. 2) within a determined movement angle range using a processor (e.g., the image signal processor 260, the control module 302, and/or the processor 120) so as to move the camera 180 so that the optical 511 and the virtual axis 512 match with each other.

Figure 6:
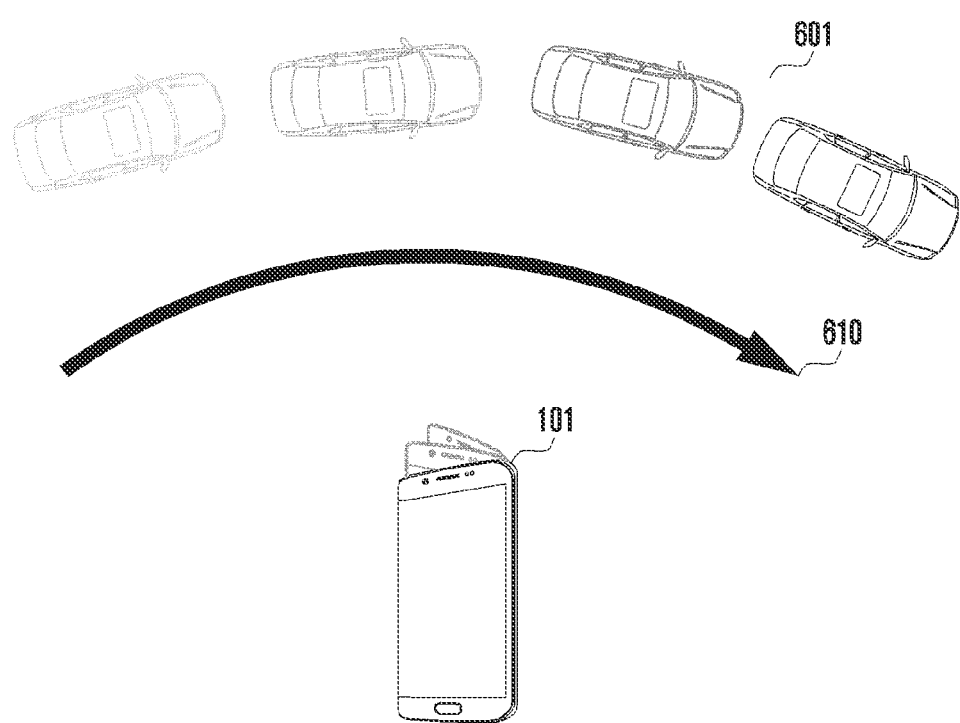
FIG. 6 is a diagram illustrating an example image capturing method using an electronic device according to various embodiments of the disclosure.

FIG. 6 is a diagram illustrating an example image capturing method using the electronic device 101 according to various embodiments of the disclosure.

The electronic device 101 including the camera 180 may, for example, capture an image while moving the electronic device 101 and/or the camera 180 according to the speed or the traveling direction of an object 601. For example, the electronic device 101 may capture an image using a panning photography technique.

Through a method for controlling movement of a camera and the electronic device 101 according to various embodiments of the disclosure, a movement of the lens actuator 314 (the image stabilizer 240 in FIG. 2) may be corrected or predicted based on the movement of the moving object 601 and/or the movement of the electronic device 101, thereby reducing a distortion (e.g., wobbling) which may occur in an image and/or video. Accordingly, the electronic device 101 may, for example, improve the quality of an image and/or video.

Figure 7:
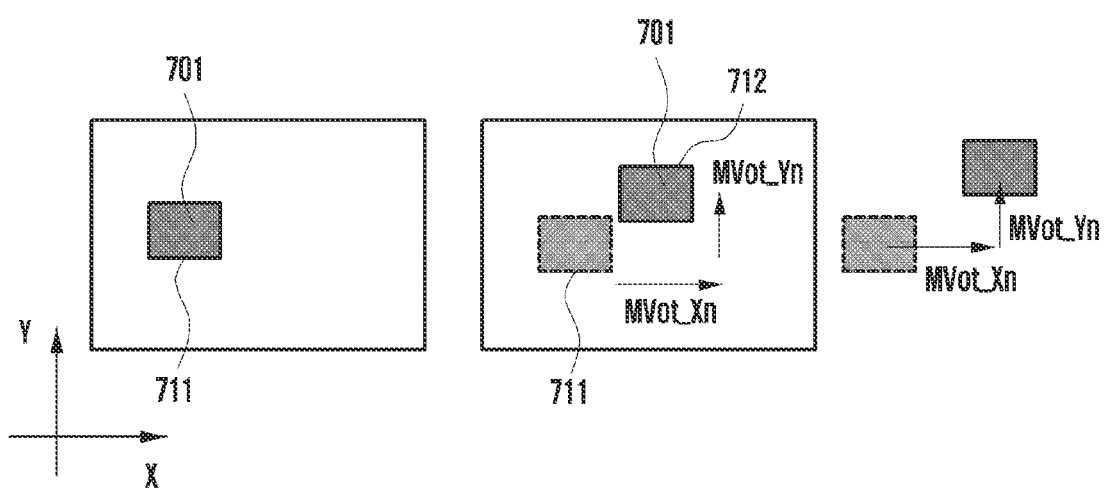
FIG. 7 is a diagram schematically illustrating a movement of an object in each frame when capturing an image of the object while moving an example electronic device according to the movement of the object according to various embodiments of the disclosure.

FIG. 7 is a diagram schematically illustrating a movement of an object 701 in each frame when capturing an image of the object 701 while moving an example electronic device 101 according to the movement of the object according to various embodiments of the disclosure.

According to various embodiments, the electronic device 101 may capture an image of an object 701 existing outside the electronic device 101 using the camera module 318. The electronic device 101 may store an image of an external object, and output same on a display (e.g., the display device 160). At the time of image capturing of the object 701, for example, while n frame is changed to n+1 frame, the object 701 may be moved from a first position 711 to a second position 712 on an image. When the change in position data is expressed using a vector having a direction and a speed, a horizontal (e.g., x-axis direction) movement of the object 701 may be expressed by MVot_Xn, and a vertical (e.g., y-axis direction) movement of the object 701 may be expressed by MVot_Yn.

Figure 8:
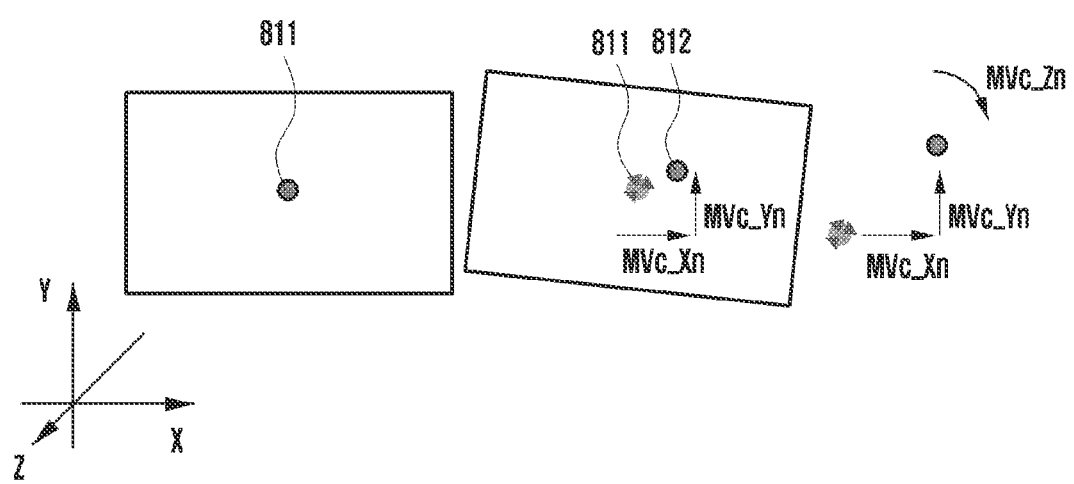
FIG. 8 is a diagram schematically illustrating a movement of an example electronic device in each frame when capturing an image of an object while moving the electronic device according to movement of the object according to various embodiments of the disclosure.

FIG. 8 is a diagram schematically illustrating a movement of an example electronic device 101 in each frame when capturing an image of the object while moving the electronic device 101 according to the movement of the object according to various embodiments of the disclosure.

At the time of image capturing, while n frame (n is an integer) is changed to n+1 frame, the center point of the camera module 318, based on the optical axis of the electronic device 101, may be moved from a first position 811 to a second position 812 on an image.

When the change in position data is expressed using a vector having a direction and a speed, a horizontal (e.g., x-axis direction) movement of the camera module 318 may be expressed by MVc_Xn, and a vertical (e.g., y-axis direction) movement of the camera module 318 may be expressed by MVc_Yn. A horizontal (e.g., x-axis direction) movement of the camera module 318 may be called a yawing motion, and a vertical (e.g., y-axis direction) movement of the camera module 318 may be called a pitching motion. A movement in a third-axis (e.g., z-axis) direction perpendicular on an orthogonal plane to a horizontal direction (e.g., x-axis direction) of the camera module 318 and a vertical direction (e.g., y-axis direction) of the camera module 318 may be called a rolling motion. A movement of the camera module 318 in a third-axis (e.g., z-axis) direction may be expressed by MVc_Zn.

Figure 9:
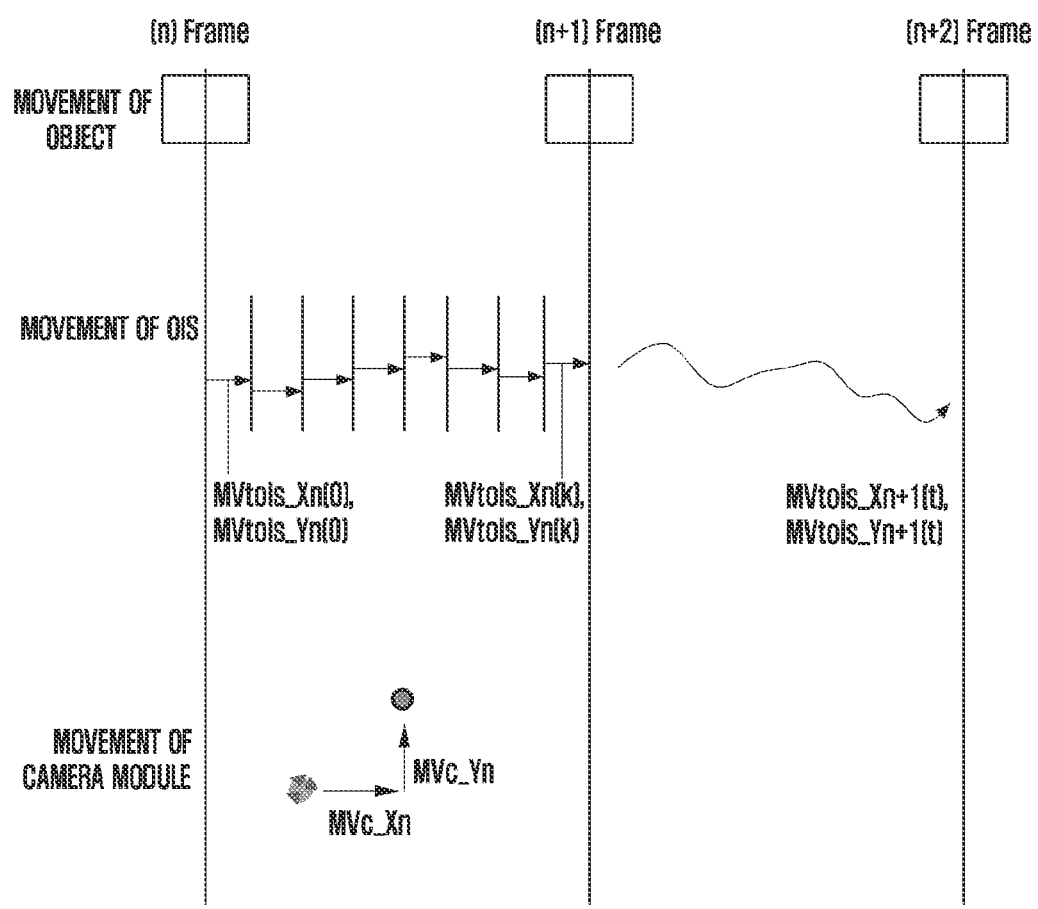
FIG. 9 is a diagram illustrating an example operation of computing and/or calculating a movement of a lens actuator when capturing an image of an object while moving an electronic device according to movement of the object according to various embodiments of the disclosure.

FIG. 9 is a diagram illustrating an example operation of computing and/or calculating a movement of the lens actuator 314 (the image stabilizer 240 in FIG. 2) when capturing an image of an object while moving the electronic device 101 according to movement of the object according to various embodiments of the disclosure.

In FIG. 9, an object movement and/or a camera module movement may be similar to or the same as that in FIG. 7 and/or FIG. 8. At least one of elements of an operation of computing and/or calculating a movement of the lens actuator 314 (the image stabilizer 240 in FIG. 2) according to an embodiment is the same as or similar to at least one of elements of an operation of computing and/or calculating a movement of the lens actuator 314 (the image stabilizer 240 in FIG. 2) illustrated in FIG. 7 and/or FIG. 8. Therefore, an overlapping description will not be repeated here.

In various embodiments, while n frame is changed to n+1 frame, the lens actuator 314 (the image stabilizer 240 in FIG. 2) may move a predetermined number of times.

In various embodiments, while n frame is changed to n+1 frame, the lens actuator 314 (the image stabilizer 240 in FIG. 2) may move k times (k is a natural number).

In various embodiments, a horizontal (e.g., x-axis direction) movement of the lens actuator 314 (the image stabilizer 240 in FIG. 2) while n frame is changed to n+1 frame may be expressed as MVtois_Xn using a vector having a direction and a speed, and a vertical (e.g., y-axis direction) movement of the lens actuator 314 (the image stabilizer 240 in FIG. 2) may be expressed as MVtois_Yn using a vector having a direction and a speed.

In various embodiments, while n frame is changed to n+1 frame, the lens actuator 314 (the image stabilizer 240 in FIG. 2) may move k times (k is a natural number). Therefore, a horizontal (e.g., x-axis direction) and/or vertical (e.g., y-axis direction) movement of the lens actuator 314 (the image stabilizer 240 in FIG. 2) may be similar to or the same as in Equation 1 and Equation 2.

$$\text{MVois\_Xn} = \sum_{i=0}^{k}(\text{MVtois\_Xn}(i)) \qquad \text{[Equation 1]}$$

$$\text{MVois\_Yn} = \sum_{i=0}^{k}(\text{MVtois\_Yn}(i)) \qquad \text{[Equation 2]}$$

In various embodiments, a horizontal direction (e.g., x-axis direction) of the lens actuator 314 (the image stabilizer 240 in FIG. 2) for t seconds while n+1 frame is changed to n+2 frame may be MVtois_Xn+1(t), and a vertical (e.g., y-axis direction) movement thereof may be MVtois_Yn+1(t).

In various embodiments, under a control of the image signal processor 260, the processor 120, and/or the control module 302, the electronic device 101 may predict a range of a motion vector of the lens actuator 314 (the image stabilizer 240 in FIG. 2) at t seconds while n+1 frame is changed to n+2 frame, using 1) a motion vector of the object 701, a motion vector of the camera module 318, and/or a motion vector of the lens actuator 314 (the image stabilizer 240 in FIG. 2) from n frame to n+1 and 2) a motion vector of the lens actuator 314 (the image stabilizer 240 in FIG. 2) at t seconds while n+1 frame is changed to n+2 frame.

In various embodiments, a horizontal direction (e.g., x-axis direction) range of a motion vector of the lens actuator 314 (the image stabilizer 240 in FIG. 2) at t seconds while n+1 frame is changed to n+2 frame may be MV'tois_Xn+1(t), and a vertical (e.g., y-axis direction) range of the motion vector of the lens actuator 314 (the image stabilizer 240 in FIG. 2) may be MV'tois_Yn+1(t).

The horizontal direction (e.g., x-axis direction) range of the motion vector of the lens actuator 314 (the image stabilizer 240 in FIG. 2) at t seconds while n+1 frame is changed to n+2 frame, and/or the vertical (e.g., y-axis direction) range of the motion vector of the lens actuator 314 (the image stabilizer 240 in FIG. 2) are expressed as follows using Equation 3 and Equation 4.

$$MV'tois\_Xn+1(t)=(MVot\_Xn+MVtois\_Xn+MVc\_Xn)/k-MVtois\_Xn+1(t), \text{ where } t=[1\sim K] \qquad \text{[Equation 3]}$$

$$MV'tois\_Yn+1(t)=(MVot\_Yn+MVtois\_Yn+MVc\_Yn)/k-MVtois\_Yn+1(t), \text{ where } t=[1\sim K] \qquad \text{[Equation 4]}$$

A predicted range of a motion vector of the lens actuator 314 (the image stabilizer 240 in FIG. 2) may be similar to or the same as a value obtained by subtracting a current motion vector of the lens actuator 314 (the image stabilizer 240 in FIG. 2) from a value obtained by dividing, by a movement per frame (e.g., an average movement value) of the lens actuator 314 (the image stabilizer 240 in FIG. 2), the sum of a motion vector of the object 701, a motion vector of the camera module 318, and/or a motion vector of the lens actuator 314 (the image stabilizer 240 in FIG. 2) in a previous frame.

Figure 10:
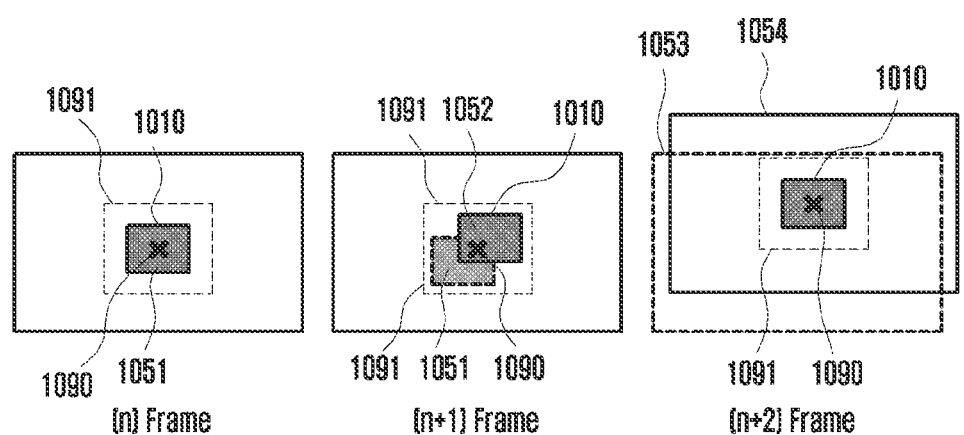
FIG. 10 is a diagram illustrating an example method for controlling movement of a camera of an electronic device in a case in which an object moves within a correction range for a movement of a lens actuator when the electronic device is not moved according to various embodiments of the disclosure.
Figure 10:
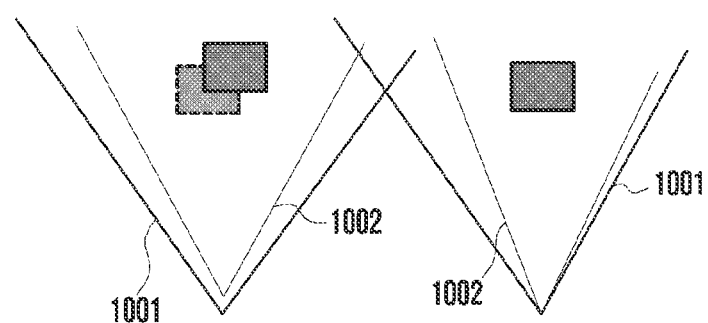

FIG. 10 is a diagram illustrating an example method for controlling movement of a camera of the electronic device 101 in a case in which an object moves within a correction range for a movement of the lens actuator 314 (e.g., the image stabilizer 240 in FIG. 2) when the electronic device 101 is not moved according to various embodiments of the disclosure.

When an image and/or video is captured while tracking an object, the electronic device 101 may move the camera module 318 so that a region 1091 of interest is positioned at a center 1090 of a frame of the image and/or video.

In n frame, when an image and/or video is captured by the electronic device 101 while tracking an object, an object 1010 may be positioned in the region 1091 of interest of the frame of the image and/or video.

In n+1 frame, when an image and/or video is captured by the electronic device 101 while tracking an object, the object 1010 may move from a first position 1051 to a second position 1052. An image capturing angle 1002 of the camera module 318 may be included in a movement range 1001 of the lens actuator 314 (e.g., the image stabilizer 240 in FIG. 2).

In n+2 frame, in a case in which an image and/or video is captured while tracking the object 1010, when the object 1010 moves from the first position 1051 to the second position 1052, the electronic device 101 may move the camera module 318 using the lens actuator 314 (e.g., the image stabilizer 240 in FIG. 2) so that the object 1010 is positioned in the region 1091 of interest of the frame of the image and/or video while corresponding to the image capturing angle 1002 of the camera module 318. When the electronic device 101 moves the camera module 318 using the lens actuator 314 (e.g., the image stabilizer 240 in FIG. 2) so that the object 1010 is positioned in the region 1091 of interest of a frame of an image and/or video while corresponding to the image capturing angle 1002 of the camera module 318, the electronic device 101 may move the camera module 318 from a third position 1053 to a fourth position 1054 so that that the object 1010 is positioned in the region 1091 of interest of the frame of the image and/or video.

Figure 11:
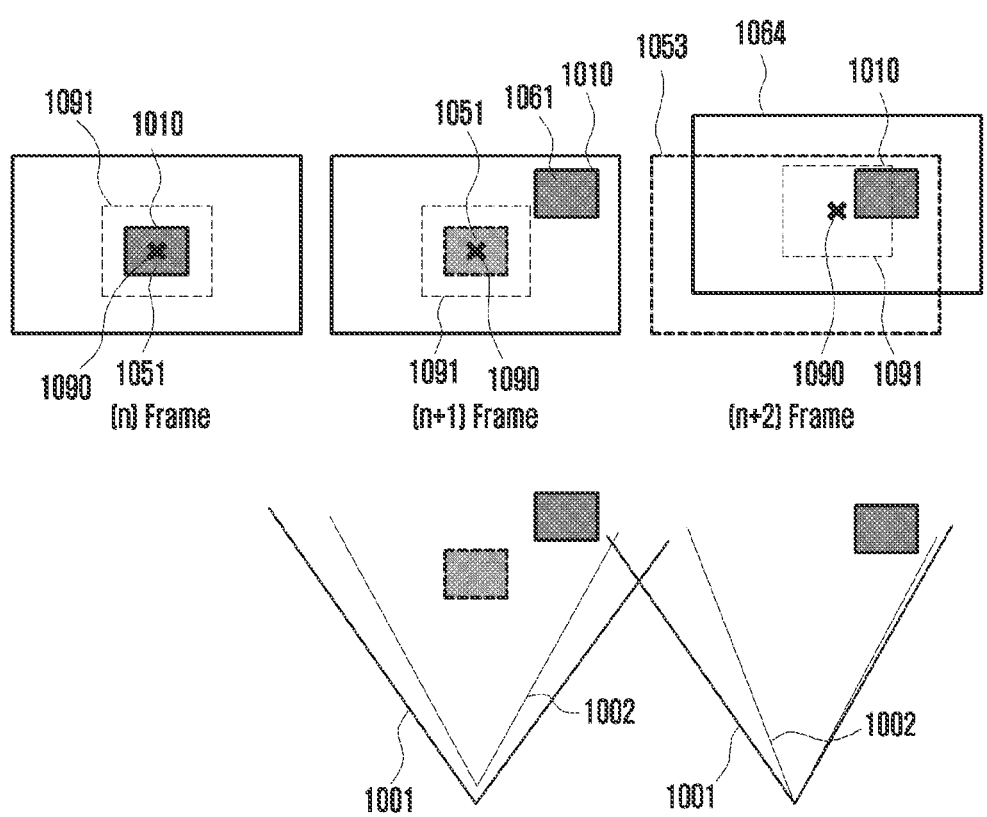
FIG. 11 is a diagram illustrating an example method for controlling movement of a camera of an electronic device in a case in which an object moves outside a correction range for a movement of a lens actuator when the electronic device is not moved according to various embodiments of the disclosure.

FIG. 11 is a diagram illustrating an example method for controlling movement of a camera of the electronic device 101 in a case in which an object moves outside a correction range for a movement of the lens actuator 314 (e.g., the image stabilizer 240 in FIG. 2) when the electronic device 101 is not moved according to various embodiments of the disclosure.

When an image and/or video is captured while tracking an object, the electronic device 101 may move the camera module 318 so that the region 1091 of interest is positioned at the center 1090 of a frame of the image and/or video.

In n frame, when an image and/or video is captured by the electronic device 101 while tracking an object, the object 1010 may be positioned in the region 1091 of interest of the frame of the image and/or video.

In n+1 frame, when an image and/or video is captured by the electronic device 101 while tracking an object, the object 1010 may move from the first position 1051 to a fifth position 1061. The image capturing angle 1002 of the camera module 318 may be positioned in the movement range 1001 of the lens actuator 314 (e.g., the image stabilizer 240 in FIG. 2).

In n+2 frame, in a case in which an image and/or video is captured while tracking the object 1010, when the object 1010 moves from the first position 1051 to the fifth position 1061, the electronic device 101 may move the camera module 318 using the lens actuator 314 (e.g., the image stabilizer 240 in FIG. 2) so that the object 1010 is positioned in the region 1091 of interest of the frame of the image and/or video while corresponding to the image capturing angle 1002 of the camera module 318. When the electronic device 101 moves the camera module 318 using the lens actuator 314 (e.g., the image stabilizer 240 in FIG. 2) so that the object 1010 is positioned in the region 1091 of interest of a frame of an image and/or video while corresponding to the image capturing angle 1002 of the camera module 318, the electronic device 101 may move the camera module 318 from the third position 1053 to a sixth position 1064 so that that the object 1010 is positioned in the region 1091 of interest of the frame of the image and/or video.

When the movement of the object 1010 is predicted to be out of a correction range of the lens actuator 314 (e.g., the image stabilizer 240 in FIG. 2), the electronic device 101 may configure to perform an automatic image capturing operation of the camera module 318, and configure to store a captured image in the memory 130 under a control of the processor 120 (e.g., the image signal processor 260 and/or the control module 302).

Figure 12:
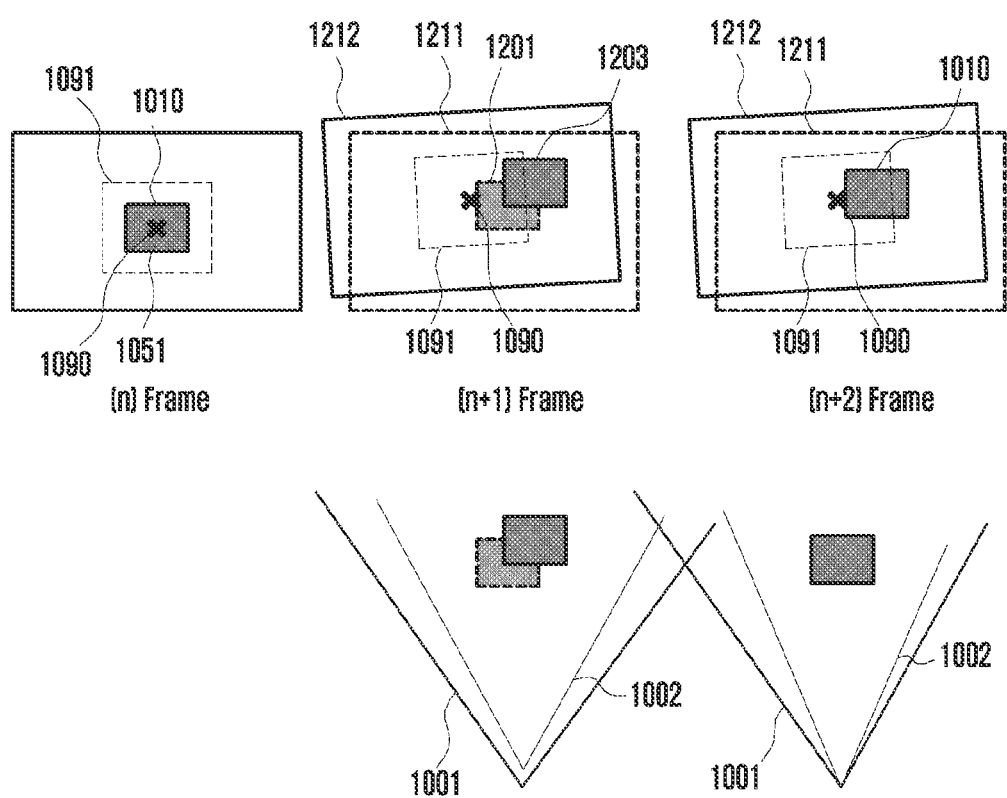
FIG. 12 is a diagram illustrating an example method for controlling movement of a camera of an electronic device in a case in which an object moves within a correction range for a movement of a lens actuator while the electronic device is moving according to various embodiments of the disclosure.

FIG. 12 is a diagram illustrating an example method for controlling movement of a camera of the electronic device 101 in a case in which an object moves within a correction range for a movement of the lens actuator 314 (e.g., the image stabilizer 240 in FIG. 2) while the electronic device 101 is moving according to various embodiments of the disclosure.

When an image and/or video is captured while tracking an object, the electronic device 101 may move the camera module 318 so that the region 1091 of interest is positioned at the center 1090 of a frame of the image and/or video.

In n frame, when an image and/or video is captured by the electronic device 101 while tracking the object 1010, the object 1010 may be positioned in the region 1091 of interest of the frame of the image and/or video.

In n+1 frame, when an image and/or video is captured by the electronic device 101 while tracking the object 1010, the object 1010 may move from a seventh position 1201 to an eighth position 1203. In addition, while the electronic device 101 is tracking the object 1010, the position of the camera module 318 of the electronic device 101 may move from a ninth position 1211 to a tenth position 1212. The image capturing angle 1002 of the camera module 318 may be positioned in the movement range 1001 of the lens actuator 314 (e.g., the image stabilizer 240 in FIG. 2).

In n+2 frame, in a case in which an image and/or video is captured while tracking the object 1010, when the object 1010 moves from the seventh position 1201 to the eighth position 1203, and the position of the camera module 318 of the electronic device 101 moves from the ninth position 1211 to the tenth position 1212, the electronic device 101 may move the camera module 318 using the lens actuator 314 (e.g., the image stabilizer 240 in FIG. 2) so that the object 1010 is positioned in the region 1091 of interest of the frame of the image and/or video while corresponding to the image capturing angle 1002 of the camera module 318. When the electronic device 101 moves the camera module 318 using the lens actuator 314 (e.g., the image stabilizer 240 in FIG. 2) so that the object 1010 is positioned in the region 1091 of interest of a frame of an image and/or video while corresponding to the image capturing angle 1002 of the camera module 318, the electronic device 101 may move the camera module 318 from the ninth position 1211 to the tenth position 1212 so that that the object 1010 is positioned in the region 1091 of interest of the frame of the image and/or video.

Figure 13:
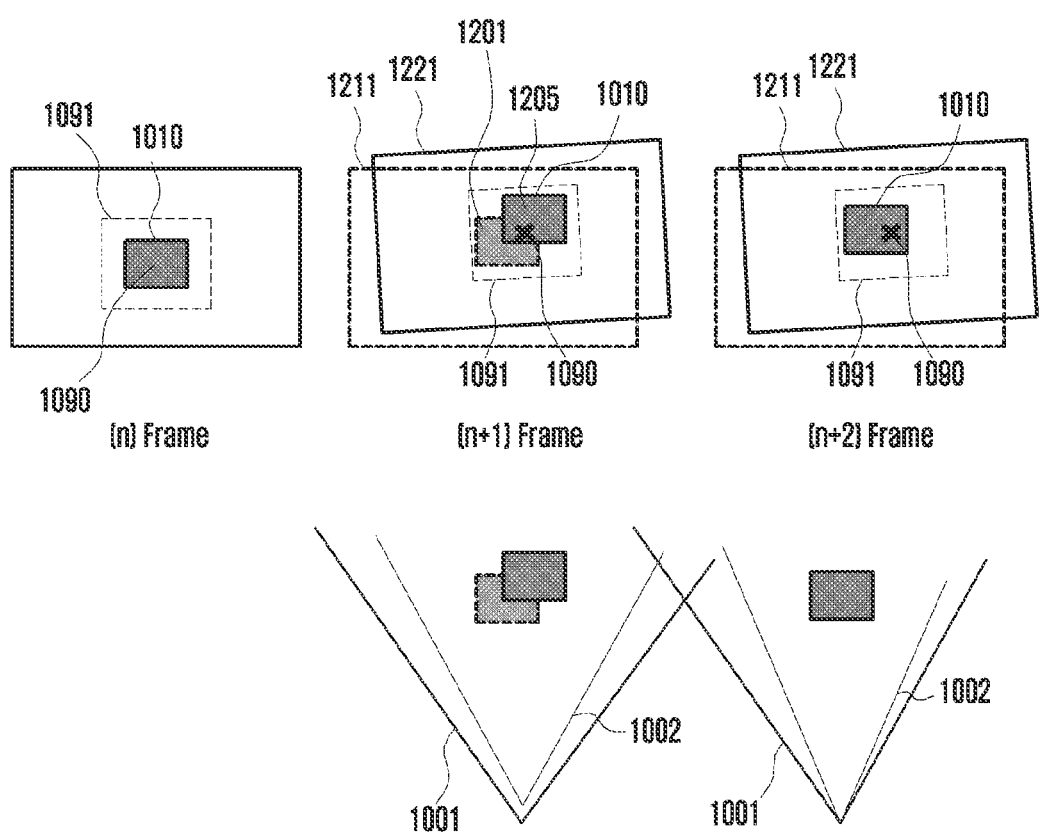
FIG. 13 is a diagram illustrating an example method for controlling movement of a camera of an electronic device in a case in which an object moves outside a correction range for a movement of a lens actuator while the electronic device is moving according to various embodiments of the disclosure.

FIG. 13 is a diagram illustrating an example method for controlling movement of a camera of the electronic device 101 in a case in which an object moves outside a correction range for a movement of the lens actuator 314 (e.g., the image stabilizer 240 in FIG. 2) while the electronic device 101 is moving according to various embodiments of the disclosure.

When an image and/or video is captured while tracking an object, the electronic device 101 may move the camera module 318 so that the region 1091 of interest is positioned at the center 1090 of a frame of the image and/or video.

In n frame, when an image and/or video is captured by the electronic device 101 while tracking the object 1010, the object 1010 may be positioned in the region 1091 of interest of the frame of the image and/or video.

In n+1 frame, when an image and/or video is captured by the electronic device 101 while tracking the object 1010, the object 1010 may move from the seventh position 1201 to an eleventh position 1205. In addition, while the electronic device 101 is tracking the object 1010, the position of the camera module 318 of the electronic device 101 may move from the ninth position 1211 to a twelfth position 1221. The image capturing angle 1002 of the camera module 318 may be positioned in the movement range 1001 of the lens actuator 314 (e.g., the image stabilizer 240 in FIG. 2).

In n+2 frame, in a case in which an image and/or video is captured while tracking the object 1010, when the object 1010 moves from the seventh position 1201 to the eleventh position 1205, and the position of the camera module 318 of the electronic device 101 moves from the ninth position 1211 to the twelfth position 1221, the electronic device 101 may move the camera module 318 using the lens actuator 314 (e.g., the image stabilizer 240 in FIG. 2) so that the object 1010 is positioned in the region 1091 of interest of the frame of the image and/or video while corresponding to the image capturing angle 1002 of the camera module 318.

When the electronic device 101 moves the camera module 318 using the lens actuator 314 (e.g., the image stabilizer 240 in FIG. 2) so that the object 1010 is positioned in the region 1091 of interest of a frame of an image and/or video while corresponding to the image capturing angle 1002 of the camera module 318, the electronic device 101 may move the camera module 318 from the ninth position 1211 to the twelfth position 1221 so that that the object 1010 is positioned in the region 1091 of interest of the frame of the image and/or video.

When the movement of the object 1010 is predicted to be out of a correction range of the lens actuator 314 (e.g., the image stabilizer 240 in FIG. 2), the electronic device 101 may configure to perform an automatic image capturing operation of the camera module 318, and configure to store a captured image in the memory 130 under a control of the processor 120 (e.g., the image signal processor 260 and/or the control module 302).

Figure 14:
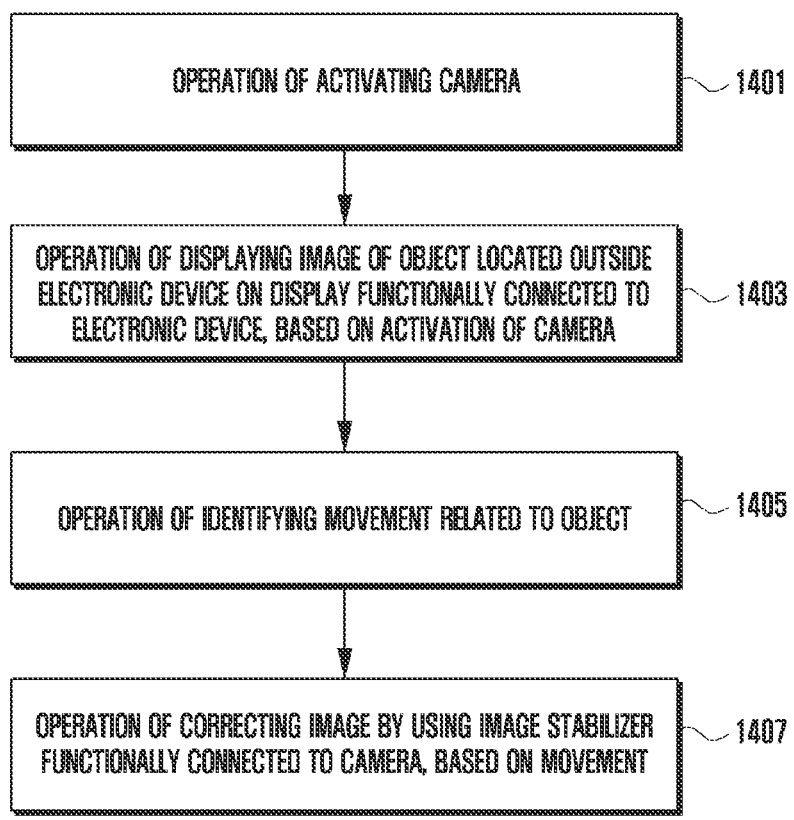
FIG. 14 is a flowchart illustrating an example method for controlling movement of a camera of an electronic device according to various embodiments of the disclosure.

FIG. 14 is a flowchart illustrating an example method for controlling movement of a camera of the electronic device 101 according to various embodiments of the disclosure.

In various embodiments, the electronic device 101 (e.g., the image signal processor 260, the processor 120, and/or the control module 302) may, in operation 1401, activate the camera 180. For example, an operation of activating the camera 180 by the electronic device 101 may be an operation of initializing the image sensor 230 and detecting an object located outside the electronic device 101 via the image sensor 230.

In various embodiments, the electronic device 101 (e.g., the image signal processor 260, the processor 120, and/or the control module 302) may, in operation 1403, display an image of an object located outside the electronic device 101 on a display (e.g., the display device 160) functionally connected to the electronic device 101, based on the activation of the camera 180.

In various embodiments, the electronic device 101 (e.g., the image signal processor 260, the processor 120, and/or the control module 302) may, in operation 1403, display an image obtained via the camera 180 on a display (e.g., the display device 160). An operation of displaying an obtained image on a display (e.g., the display device 160) may include a preview operation.

In various embodiments, the electronic device 101 (e.g., the image signal processor 260, the processor 120, and/or the control module 302) may, in operation 1405, identify a movement related to an object.

In various embodiments, an operation of identifying a movement of an image of the object in operation 1405 by the electronic device 101 (e.g., the image signal processor 260, the processor 120, and/or the control module 302) may include an operation of selecting an object to be captured, by a user input and/or an object selection process, and tracking the object.

In various embodiments, the electronic device 101 (e.g., the image signal processor 260, the processor 120, and/or the control module 302) may, in operation 1405, move the camera 180 so that a region of interest is positioned within a region of interest of a frame of an image and/or video, when capturing the image and/or video while tracking the object.

In various embodiments, the electronic device 101 (e.g., the image signal processor 260, the processor 120, and/or the control module 302) may, in operation 1407, correct an image using the image stabilizer 240 (e.g., the lens actuator 314) functionally connected to the camera 180, based on a movement related to an object. In various embodiments, in operation 1407, as an operation of correcting an image using the image stabilizer 240 (e.g., the lens actuator 314) functionally connected to the camera 180, based on a movement related to an object, the electronic device 101 (e.g., the image signal processor 260, the processor 120, and/or the control module 302) may perform a hand tremor correction operation.

In various embodiments, an operation of correcting, by the electronic device 101 (e.g., the image signal processor 260, the processor 120, and/or the control module 302), an image using the image stabilizer 240 (e.g., the lens actuator 314) functionally connected to the camera 180, based on a movement related to an object in operation 1407 may be an operation of calculating a movable correction angle of the image stabilizer 240 (e.g., the lens actuator 314).

In various embodiments, the operation of calculating a movable correction angle of the image stabilizer 240 (e.g., the lens actuator 314) may be as follows. In various embodiments, the electronic device 101 (e.g., the image signal processor 260, the processor 120, and/or the control module 302) may, in operation 1407, calculate a movable correction angle of the image stabilizer 240 (e.g., the lens actuator 314), based on a value obtained by subtracting a motion vector of the image stabilizer 240 (e.g., the lens actuator 314) in a current frame from a value obtained by dividing, by the number of movements per frame (e.g., an average number of movements) of the image stabilizer 240 (e.g., the lens actuator 314), the sum of a motion vector of the object, a motion vector of the camera 180, and/or a motion vector of the image stabilizer 240 (e.g., the lens actuator 314) in a previous frame.

In various embodiments, in operation 1407, as an operation of correcting an image using the image stabilizer 240

(e.g., the lens actuator 314) functionally connected to the camera 180, based on a movement related to an object, the electronic device 101 (e.g., the image signal processor 260, the processor 120, and/or the control module 302) may control the movement and/or a movement angle of the image stabilizer 240 (e.g., the lens actuator 314), based on a calculated movable correction angle of the image stabilizer 240 (e.g., the lens actuator 314).

In various embodiments, the electronic device 101 (e.g., the image signal processor 260, the processor 120, and/or the control module 302) may, in operation 1407, determine whether capturing of an image and/or video via the camera 180 has been ended. When capturing of an image and/or video via the camera 180 has not been ended, the electronic device 101 (e.g., the image signal processor 260, the processor 120, and/or the control module 302) may calculate a movable correction angle of the image stabilizer 240 (e.g., the lens actuator 314).

When capturing of an image and/or video via the camera 180 has been ended, the electronic device 101 (e.g., the image signal processor 260, the processor 120, and/or the control module 302) may end object tracking, store the image and/or video in the memory 130, and restart a preview operation. In various embodiments, in operation 1407, as an operation of correcting an image using the image stabilizer 240 (e.g., the lens actuator 314) functionally connected to the camera 180, based on a movement related to an object, the electronic device 101 (e.g., the image signal processor 260, the processor 120, and/or the control module 302) may end image capturing when the object has been moved out of a calculated movable correction angle.

In various embodiments, in operation 1407, as an operation of correcting an image using the image stabilizer 240 (e.g., the lens actuator 314) functionally connected to the camera 180, based on a movement related to an object, the electronic device 101 (e.g., the image signal processor 260, the processor 120, and/or the control module 302) may maintain an image capturing operation when the object has been moved into a calculated movable correction angle.

In various embodiments, in operation 1407, as an operation of correcting an image using the image stabilizer 240 (e.g., the lens actuator 314) functionally connected to the camera 180, based on a movement related to an object, when capturing of an image and/or video via the camera 180 has been ended, the electronic device 101 (e.g., the image signal processor 260, the processor 120, and/or the control module 302) may end object tracking, store the image and/or video in the memory 130, and restart a preview operation.

Figure 15:
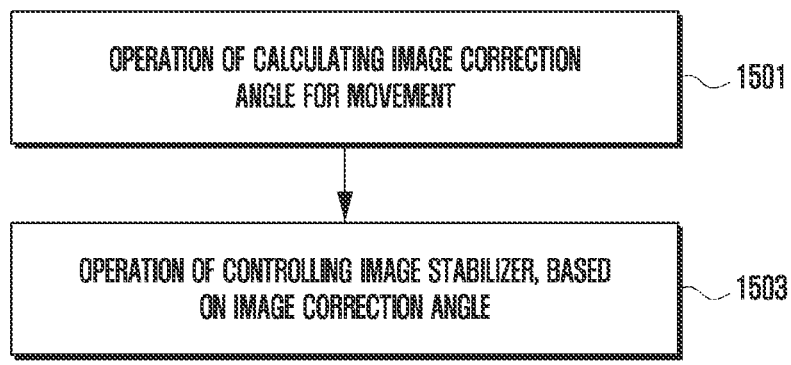
FIG. 15 is a flowchart illustrating an example operation of correcting an image, based on a movement of an object by an electronic device according to various embodiments of the disclosure.

FIG. 15 is a flowchart illustrating an example operation of correcting an image, based on a movement of an object by the electronic device 101 according to various embodiments of the disclosure.

In various embodiments, the electronic device 101 (e.g., the image signal processor 260, the processor 120, and/or the control module 302) may, in operation 1501, calculate an image correction angle for a movement of an object.

In various embodiments, the electronic device 101 (e.g., the image signal processor 260, the processor 120, and/or the control module 302) may, in operation 1501, calculate an image correction angle, based on a movement related to an object.

In various embodiments, an operation of calculating an image correction angle, based on a movement related to an object may be as follows.

In various embodiments, the electronic device 101 (e.g., the image signal processor 260, the processor 120, and/or the control module 302) may, in operation 1501, calculate an image correction angle, based on a value obtained by subtracting a motion vector of the image stabilizer 240 (e.g., the lens actuator 314) in a current frame from a value obtained by dividing, by the number of movements per frame (e.g., an average number of movements) of the image stabilizer 240 (e.g., the lens actuator 314), the sum of a motion vector of the object, a motion vector of the camera 180, and/or a motion vector of the image stabilizer 240 (e.g., the lens actuator 314) in a previous frame.

In various embodiments, the electronic device 101 (e.g., the image signal processor 260, the processor 120, and/or the control module 302) may, in operation 1503, control the image stabilizer 240 (e.g., the lens actuator 314), based on a calculated image correction angle.

In various embodiments, in operation 1503, as an operation of controlling the image stabilizer 240 (e.g., the lens actuator 314), based on a calculated image correction angle, the electronic device 101 (e.g., the image signal processor 260, the processor 120, and/or the control module 302) may control the movement and/or a movement angle of the image stabilizer 240 (e.g., the lens actuator 314), based on a calculated movable correction angle of the image stabilizer 240 (e.g., the lens actuator 314).

A method for controlling movement of the camera 180 according to various embodiments may include: activating the camera 180 functionally connected to the electronic device 101; based on the activation of the camera 180, displaying an image of an object located outside the electronic device 101 on a display (e.g., the display device 160) functionally connected to the electronic device 101; identifying a movement of the image of the object; and based on the movement, correcting the image using the image stabilizer 240 (e.g., the lens actuator 314) functionally connected to the electronic device 101, wherein the correcting of the image includes: calculating an image correction angle for the movement; and based on the image correction angle, controlling the image stabilizer 240 (e.g., the lens actuator 314).

The method for controlling movement of the camera 180 according to various embodiments may further include: determining whether capturing of an image and/or video via the camera 180 has been ended; and when the capturing of the image and/or video via the camera 180 has been ended, ending object tracking and storing the image and/or video in the memory 130 functionally connected to the electronic device 101.

The method for controlling movement of the camera 180 according to various embodiments may further include: calculating a movable correction angle of the image stabilizer 240 (e.g., the lens actuator 314); and when the object has been moved out of the calculated movable correction angle, ending image capturing.

The method for controlling movement of the camera 180 according to various embodiments may further include calculating a movable correction angle of the image stabilizer 240 (e.g., the lens actuator 314), based on a motion vector of the object, a motion vector of the camera 180, and/or a motion vector of the image stabilizer 240 (e.g., the lens actuator 314).

The method for controlling movement of the camera 180 according to various embodiments may further include calculating a movable correction angle of the image stabilizer 240 (e.g., the lens actuator 314), based on a value obtained by subtracting a motion vector of the image stabilizer 240 (e.g., the lens actuator 314) in a current frame from a value obtained by dividing, by an average movement value per frame of the image stabilizer 240 (e.g., the lens actuator 314), the sum of a motion vector of the object in a previous frame, a motion vector of the camera 180 in the previous frame, and/or a motion vector of the image stabilizer 240 (e.g., the lens actuator 314) in the previous frame.

The method for controlling movement of the camera 180 according to various embodiments may include selecting an object to be captured, by a user input and/or an object selection process.

The method for controlling movement of the camera 180 according to various embodiments may further include moving the camera 180 so that a region of interest is positioned at a center of a frame of an image and/or video, when the image and/or video is captured while tracking the object.

The method may include calculating the motion vector of the camera 180 according to various embodiments, based on information obtained by a sensor module functionally connected to the electronic device 101.

The electronic device 101 according to various embodiments may include: the camera 180; a display (e.g., the display device 160); the memory 130; a sensor module; and a processor (e.g., the image signal processor 260, the processor 120, and/or the control module 302) functionally connected to the camera, the display, the memory, and the sensor module, wherein the processor (e.g., the image signal processor 260, the processor 120, and/or the control module 302) is configured to activate the camera 180, display, based on the activation of the camera 180, an image of an object located outside the electronic device 101 on a display (e.g., the display device 160) functionally connected to the electronic device 101, identify a movement of the image of the object, and based on the movement, perform correcting of the image using the image stabilizer 240 (e.g., the lens actuator 314) functionally connected to the electronic device 101, and wherein the correcting of the image includes calculating an image correction angle for the movement, and based on the image correction angle, controlling the image stabilizer 240 (e.g., the lens actuator 314).

The processor (e.g., the image signal processor 260, the processor 120, and/or the control module 302) according to various embodiments may be configured to determine whether capturing of an image and/or video via the camera 180 has been ended, and when the capturing of the image and/or video via the camera 180 has been ended, end object tracking and store the image and/or video in the memory 130.

The processor (e.g., the image signal processor 260, the processor 120, and/or the control module 302) according to various embodiments may be configured to calculate a movable correction angle of the image stabilizer 240 (e.g., the lens actuator 314), and when the object has been moved out of the calculated movable correction angle, end image capturing.

The processor (e.g., the image signal processor 260, the processor 120, and/or the control module 302) according to various embodiments may be configured to calculate a movable correction angle of the image stabilizer 240 (e.g., the lens actuator 314), based on a motion vector of the object, a motion vector of the camera 180, and/or a motion vector of the image stabilizer 240 (e.g., the lens actuator 314).

The processor (e.g., the image signal processor 260, the processor 120, and/or the control module 302) according to various embodiments may be configured to calculate a movable correction angle of the image stabilizer 240 (e.g., the lens actuator 314), based on a value obtained by subtracting a motion vector of the image stabilizer 240 (e.g., the lens actuator 314) in a current frame from a value obtained by dividing, by an average movement value per frame of the image stabilizer 240 (e.g., the lens actuator 314), the sum of a motion vector of the object in a previous frame, a motion vector of the camera 180 in the previous frame, and/or a motion vector of the image stabilizer 240 (e.g., the lens actuator 314) in the previous frame.

The processor (e.g., the image signal processor 260, the processor 120, and/or the control module 302) according to various embodiments may be configured to select an object to be captured, by reception of a user input and/or an object selection process.

The processor (e.g., the image signal processor 260, the processor 120, and/or the control module 302) according to various embodiments may be configured to move the camera 180 so that a region of interest is positioned at a center of a frame of an image and/or video, when the image and/or video is captured while tracking the object.

The image stabilizer 240 (e.g., the lens actuator 314) according to various embodiments may include: the tilting-type image stabilizer 240 (e.g., the lens actuator 314); or the lens shift-type image stabilizer 240 (e.g., the lens actuator 314).

The motion vector of the camera 180 according to various embodiments may be calculated based on information obtained by a sensor module functionally connected to the electronic device 101.

In a computer-readable storage medium (e.g., the memory 130) including instructions stored to execute an operation of controlling movement of the camera 180 when executed by a processor (e.g., the image signal processor 260, the processor 120, and/or the control module 302) according to various embodiments, the instructions may include: activating the camera 180 functionally connected to the processor (e.g., the image signal processor 260, the processor 120, and/or the control module 302); based on the activation of the camera 180, displaying an image of an object located outside the electronic device 101 on a display (e.g., the display device 160) functionally connected to the processor (e.g., the image signal processor 260, the processor 120, and/or the control module 302); identifying a movement of the image of the object; and based on the movement, correcting the image using the image stabilizer 240 (e.g., the lens actuator 314) functionally connected to the processor (e.g., the image signal processor 260, the processor 120, and/or the control module 302), and the correcting of the image may include: calculating an image correction angle for the movement; and based on the image correction angle, controlling the image stabilizer 240 (e.g., the lens actuator 314).

In the computer-readable storage medium (e.g., the memory 130) including instructions stored to execute an operation of controlling movement of the camera 180 when executed by the processor (e.g., the image signal processor 260, the processor 120, and/or the control module 302) according to various embodiments, the instructions may further include calculating a movable correction angle of the image stabilizer 240 (e.g., the lens actuator 314), based on a motion vector of the object, a motion vector of the camera 180, and/or a motion vector of the image stabilizer 240 (e.g., the lens actuator 314).

In the computer-readable storage medium (e.g., the memory 130) including instructions stored to execute an operation of controlling movement of the camera 180 when executed by the processor (e.g., the image signal processor 260, the processor 120, and/or the control module 302) according to various embodiments, the instructions may further include moving the camera 180 so that a region of interest is positioned at a center of a frame of an image and/or video, when the image and/or video is captured while tracking the object.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may refer, for example, to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for controlling movement of a camera of an electronic device, the method comprising:
   activating a camera functionally connected to the electronic device;
   based on the activation of the camera, displaying an image of an object located outside the electronic device on a display functionally connected to the electronic device;
   identifying a movement of the object; and
   based on the movement, correcting the image using an image stabilizer functionally connected to the electronic device,
   wherein the correcting of the image comprises:
   obtaining a motion vector of the object;
   obtaining a motion vector of the camera and a motion vector of the image stabilizer using at least one sensor;
   calculating a movable correction angle of the image stabilizer based on a difference between the motion vector of the image stabilizer in a current frame and a value based on a sum of the motion vector of the object in a previous frame before the current frame, a motion vector of the camera in the previous frame, and a motion vector of the image stabilizer in the previous frame; and based on the movable correction angle, controlling the image stabilizer.

2. The method of claim 1, further comprising:
determining whether capturing of an image and/or video via the camera has ended; and
when the capturing of the image and/or video via the camera has ended, ending object tracking and storing the image and/or video in a memory functionally connected to the electronic device.

3. The method of claim 1, further comprising:
when the object has moved out of the calculated movable correction angle, ending image capturing.

4. The method of claim 1,
wherein the motion vector of the camera is calculated based on information obtained by at least one sensor functionally connected to the electronic device.

5. The method of claim 1, wherein the value is obtained by dividing, by an average movement value per frame of the image stabilizer, the sum of a motion vector of the object in a previous frame, the motion vector of the camera in the previous frame, and the motion vector of the image stabilizer in the previous frame.

6. The method of claim 1, wherein the identifying of the movement of the image of the object comprises selecting an object to be captured, by a user input and/or an object selection process.

7. The method of claim 1, wherein the identifying of the movement of the object further comprises moving the camera so that a region of interest is positioned at a center of a frame of an image and/or video, when the image and/or video is captured while tracking the object.

8. An electronic device comprising:
a camera;
a display;
a memory;
at least one sensor; and
a processor functionally connected to the camera, the display, the memory, and the at least one sensor,
wherein the processor is configured to:
activate the camera;
based on the activation of the camera, display an image of an object located outside the electronic device on the display;
identify a movement of the object; and
based on the movement, perform correcting of the image using an image stabilizer functionally connected to the electronic device, and wherein the correcting of the image comprises:
obtaining a motion vector of the object;
obtaining a motion vector of the camera and a motion vector of the image stabilizer using the at least one sensor;
calculating a movable correction angle of the image stabilizer based on a difference between the motion vector of the image stabilizer in a current frame and a value based on a sum of the motion vector of the object in a previous frame before the current frame, a motion vector of the camera in the previous frame, and a motion vector of the image stabilizer in the previous frame; and
based on the movable correction angle, controlling the image stabilizer.

9. The electronic device of claim 8, wherein the processor is configured to:
determine whether capturing of an image and/or video via the camera has ended; and
when the capturing of the image and/or video via the camera has ended, end object tracking and store the image and/or video in the memory.

10. The electronic device of claim 8, wherein the processor is configured to:
when the object has moved out of the calculated movable correction angle, end image capturing.

11. The electronic device of claim 8,
wherein the motion vector of the camera is calculated based on information obtained by the at least one sensor.

12. The electronic device of claim 8, wherein the value is obtained by dividing, by an average movement value per frame of the image stabilizer, a sum of a motion vector of the object in a previous frame, the motion vector of the camera in the previous frame, and the motion vector of the image stabilizer in the previous frame.

13. The electronic device of claim 8, wherein the processor is configured to select an object to be captured, by reception of a user input and/or an object selection process.

14. The electronic device of claim 8, wherein the processor is configured to move the camera so that a region of interest is positioned at a center of a frame of an image and/or video, when the image and/or video is captured while tracking the object.

15. The electronic device of claim 8, wherein the image stabilizer comprises:
a tilting-type image stabilizer; or
a lens shift-type image stabilizer.

* * * * *